United States Patent [19]

Fischer

[11] 4,411,546
[45] Oct. 25, 1983

[54] OIL WELL SUCKER ROD SHEAR TOOL

[75] Inventor: Carlin P. Fischer, Omaha, Nebr.

[73] Assignee: Technicraft, Inc., Omaha, Nebr.

[21] Appl. No.: 420,329

[22] Filed: Sep. 20, 1982

[51] Int. Cl.³ .................... F16B 11/00; F16D 1/00; F16D 3/64; F16L 11/12

[52] U.S. Cl. .................................... 403/23; 403/2; 403/286

[58] Field of Search ................ 403/23, 6, 7, 286, 293, 403/2; 285/2, 3, 4, 45

[56] References Cited

U.S. PATENT DOCUMENTS

| | | | |
|---|---|---|---|
| 2,772,550 | 12/1956 | Harrington | 403/286 X |
| 3,922,104 | 9/1974 | McCullough | 285/2 X |
| 3,961,642 | 6/1976 | Thomas et al. | 403/2 X |
| 4,016,796 | 4/1977 | Brannan | 403/2 X |
| 4,058,328 | 11/1977 | Nickerson et al. | 285/45 |
| 4,211,439 | 7/1980 | Moldestad | 285/45 X |
| 4,350,372 | 9/1982 | Logsdon | 285/45 |

FOREIGN PATENT DOCUMENTS 181204 2/1936 Switzerland ........................ 285/2

Primary Examiner—Wayne L. Shedd
Attorney, Agent, or Firm—Zarley, McKee, Thomte, Voorhees & Sease

[57] ABSTRACT

An oil well sucker rod shear tool is described comprising a generally cylindrical elongated member having externally threaded portions at the opposite ends thereof. The elongated member has a reduced diameter portion formed therein between the ends thereof which serves as a shear portion designed to shear upon a predetermined amount of stress being subjected thereto. A cylindrical sleeve is sealably mounted on the elongated member around the shear portion not only to protect the shear portion from the corrosive effects of the fluid being pumped but to also prevent deflection of the shear portion. A cylindrical nut is threadably mounted on the elongated member to maintain the sleeve thereon.

7 Claims, 3 Drawing Figures

OIL WELL SUCKER ROD SHEAR TOOL

BACKGROUND OF THE INVENTION

This invention relates to an oil well shear tool which may be used in a sucker rod string or in a fishing tool string.

In the typical producing oil well, a pump is secured to the lower end of a sucker rod string and is vertically oscillated by means of pumping equipment of the walking beam type. If the sucker rod string should fail or shear between the upper and lower ends thereof, it is necessary for the upper portion of the sucker rod string to be first removed from the well with fishing operations then being conducted to retrieve the lower portion of the sucker rod string and the pump at the lower end thereof. It has been found desirable to provide a shear tool near the lower end of the sucker rod string which will shear upon a predetermined amount of stress being experienced by the string. It has been found desirable to cause the shear near the pump since it is easier to fish the pump from the well than a long string of sucker rods.

Shear tools have been provide which include a shear portion designed to shear upon predetermined stress being subjected thereto. However, the fluid being pumped is normally very corrosive and the shear portion is subjected to corrosion which dramatically affects the shear characteristics. An attempt has been made in prior art shear tools to prevent the corrosion of the shear portion by encapsulating or coating the shear portion with plastic but the plastic material quickly chips or peels therefrom. A second disadvantage in the prior art shear tools is that the shear portions thereof tend to deflect thereby causing premature failure of the shear portion.

Therefore, it is a principal object of the invention to provide an improved shear tool for use in oil wells.

A further object of the invention is to provide an oil well sucker rod shear tool including means for preventing the shear portion thereof from being sujected to the corrosive fluid being pumped.

Still another object of the invention is to provide a shear tool including means for preventing deflection of the shear portion.

Still another object of the invention is to provide a shear tool which may be used with fishing tools or which may be used with sucker rods.

These and other objects will be apparent to those skilled in the art.

SUMMARY OF THE INVENTION

Figure 1:
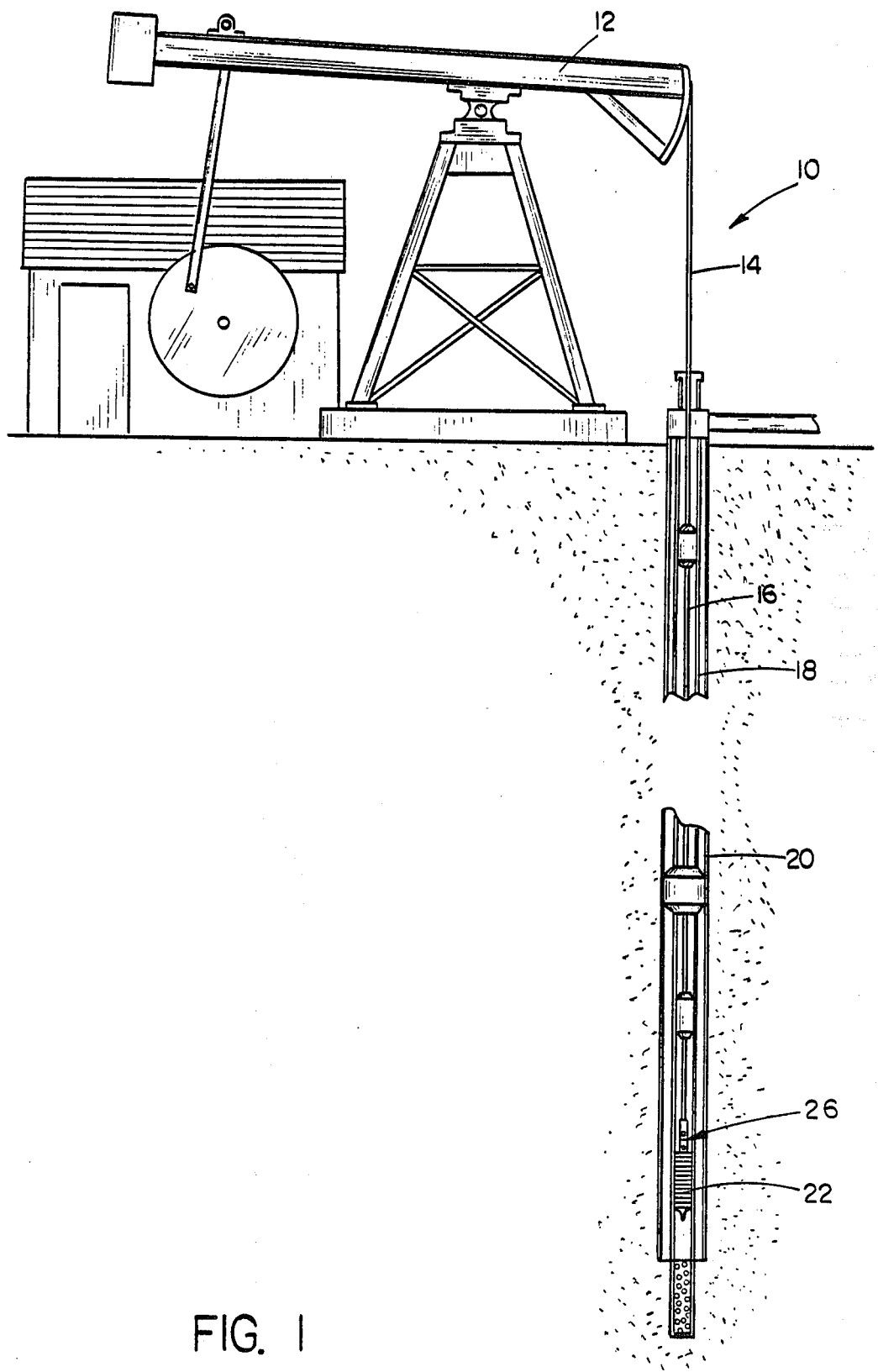
FIG. 1 illustrates the shear tool of this invention being used in an oil well.
Figure 2:
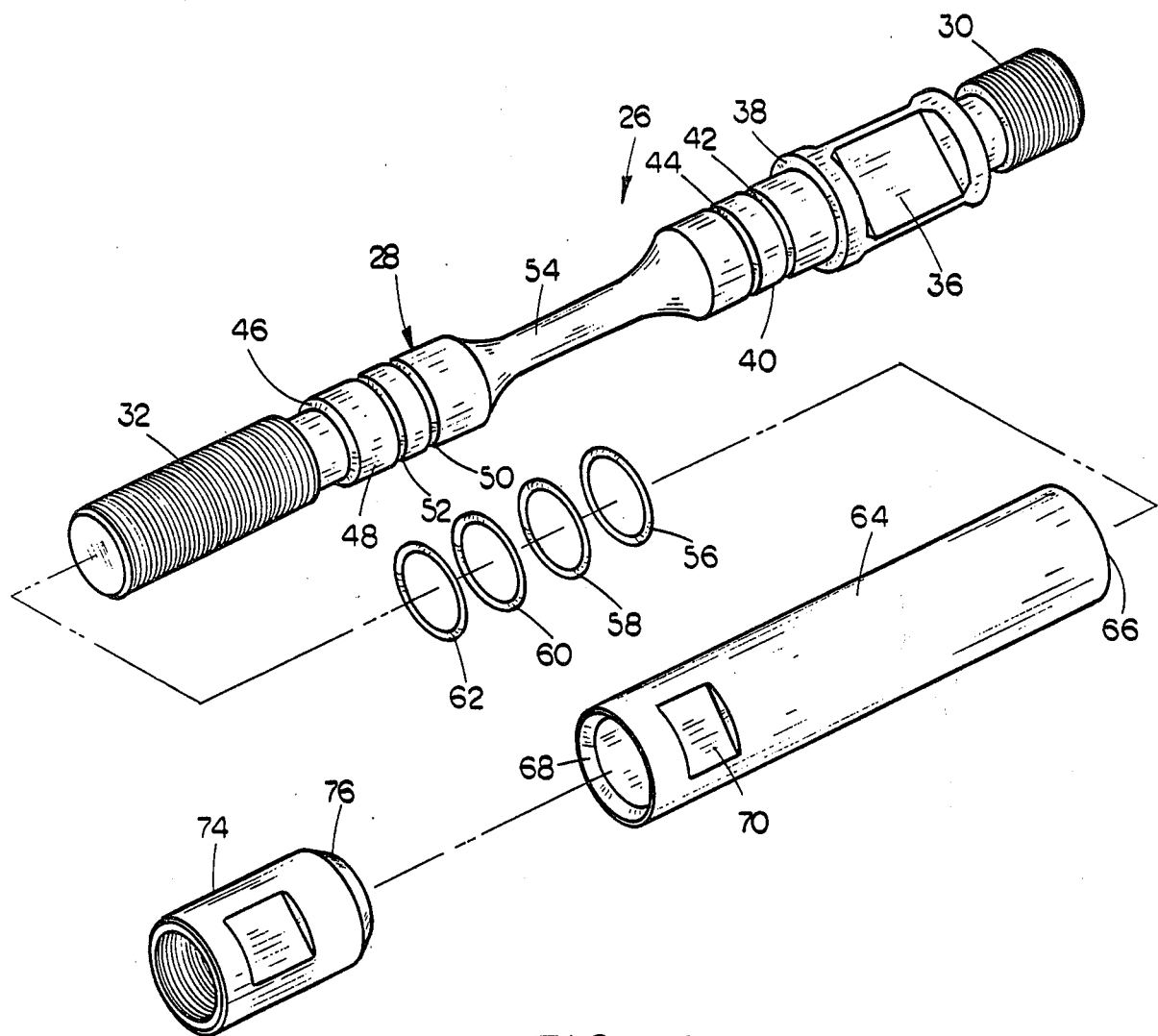
FIG. 2 is an exploded perspective view of the shear tool of this invention.

A shear tool is disclosed which may be used during fishing operations or which may be used in an oil well sucker rod string. The shear tool comprises an elongated member having externally threaded ends with a reduced diameter or milled portion positioned therebetween which serves as a shear portion designed to shear upon predetermined stress being subjected thereto. A pair of cylindrical portions are provided on the elongated member adjacent the opposite ends of the shear portion. O-rings are mounted on the cylindrical portions and sealably engage the interior surface of an elongated sleeve or collar which embraces the elongated member and which surrounds the shear portion. A cylindrical nut is threadably mounted on one of the externally threaded portions to maintain the sleeve in position so that the corrosive fluid being pumped is prevented from coming into contact with the shear portion. The collar also prevents deflection of the shear portion.

DESCRIPTION OF THE PREFERRED EMBODIMENT

The numeral 10 in the drawings refers to conventional oil well pump equipment including a walking beam 12 having a polish rod 14 connected to the upper end of a sucker rod string 16 which is vertically moved within tubing 18 which is encased by casing 20. The numeral 22 refers to a conventional pump provided at the lower end of the sucker rod string.

The oil well sucker rod shear tool of this invention is referred to generally by the reference numeral 26. Tool 26 comprises an generally cylindrical and elongated member 28 having externally threaded portions 30 and 32 at its lower and upper ends respectively. Member 28 is provided with four opposing wrench surfaces 36 to enable a wrench to be mounted thereon. As seen in the drawings, elongated member 28 is provided with an annular shoulder 38 located adjacent the cylindrical surface 40 which is provided with a pair of O-ring grooves 42 and 44 formed therein. Member 28 is also provided with an annular shoulder 46 located adjacent cylindrical surface 48 which also has a pair of O-ring grooves 50 and 52 formed therein. O-rings 56, 58, 60 and 62 are adapted to be received by the grooves 42, 44, 50 and 52 respectively.

The numeral 54 refers to a reduced diameter portion between cylindrical portions 48 and 40 which is designed to shear upon a predetermined amount of stress being subjected thereto. The diameter and length of shear portion 54 will depend upon the particular shear characteristics desired.

Figure 3:
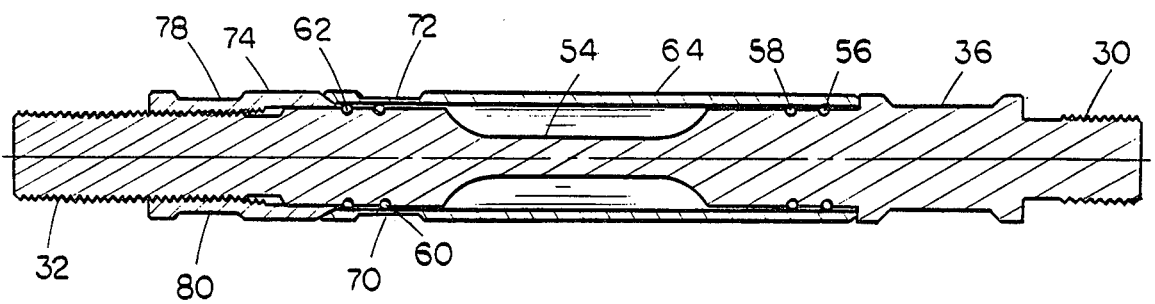
FIG. 3 is a longitudinal sectional view of the shear tool of this invention.

An elongated hollow sleeve 64 embraces a portion of elongated member 28 and has one end 66 adapted to engage shoulder 38 as seen in FIG. 3. The other end of collar 64 is provided with beveled surface 68. As seen in the drawings, a pair of wrench surfaces 70 and 72 are provided on collar 64 adjacent one end thereof.

An internally threaded nut 74 is threadably mounted on the threaded portion 32 and has a tapered inner end 76 which is designed to be received by the beveled end of sleeve 64 as best illustrated in FIG. 3. Nut 74 is provided with wrench surfaces 78 and 80 thereon. Thus, when the sleeve 64 is mounted on the elongated member 28 and nut 74 is installed, the O-rings 56, 58, 60 and 62 engage the inside surface of sleeve 64 to prevent the corrosive fluid being pumped from coming into contact with the shear portion 54. The engagement of the end 66 with the shoulder 38 and the engagement of the inner end 76 of nut 74 with the end of collar 64 also aids in preventing fluid from entering the interior of the sleeve 64. The tool is preferably constructed of 4620 nickel molybdenum.

The sleeve 64 also aids in preventing deflection of the shear portion 54 due to the engagement of the end 66 with shoulder 38 and the engagement of nut 74 with end 68. The sleeve also eliminates the requirement that the reduced diameter portion 54 be prestressed as in prior art devices.

In use, the tool is preferably installed closely adjacent the upper end of the pump and would have its threaded end 30 secured to a connector at the upper end of the pump. The threaded portion 32 would be secured to the lower end of the sucker rod assembly. However, the tool may be installed one or two rod lengths above the pump if desired. When a predetermined amount of stress is experienced by the sucker rod assembly, shear portion 54 will shear which causes the separation of the sucker rod assembly from the pump. The sucker rod assembly is then removed from the well and appropriate fishing tools are employed to raise the pump assembly from the lower end of the well.

The tool described herein may not only be used in sucker rod strings but may also be used in connection with fishing tool operations. In other words, the shear tool of this invention could be provided in the fishing tool string so that the fishing tool string would shear upon predetermined stress thereby preventing damage to the well tubing.

Thus it can be seen that the shear tool of this invention is not only conveniently assembled and positioned between the sucker rod assembly and the pump, but a means has been provided for preventing shear portion 54 from suffering from the corrosive effects of the fluid being pumped. If the corrosive fluid was allowed to come into contact with the shear portion 54, the shear portion 54 would quickly corrode and would undoubtedly fail prior to the desired level of failure.

I claim:

1. An oil well pump sucker rod shear tool comprising,
an elongated generally cylindrical member having first and second ends, one of said ends being threaded for connection to a threaded member operatively connected to the well pump, the other of said ends being externally threaded for connection to a sucker rod,
said elongated member having a reduced diameter portion formed therein between its ends forming a shear portion which will shear upon predetermined stress,
and a sleeve sealably mounted on said elongated member which protects said shear portion from the corrosive effects of the fluid being pumped.

2. The tool of claim 1 wherein said elongated member has first and second cylindrical portions at the opposite ends of said reduced diameter portion, each of said cylindrical portions having O-ring grooves formed therein which receive O-rings, said sleeve embracing said cylindrical portions and said O-rings.

3. The tool of claim 2 wherein said elongated member has an annular shoulder formed therein adjacent one end of said first cylindrical portion, one end of said sleeve being in engagement with said annular shoulder.

4. The tool of claim 3 wherein a cylindrical nut is threadably mounted on said second end of said elongated member and engages the other end of said sleeve and maintains said sleeve in engagement with said annular shoulder and on said elongated member.

5. The tool of claim 4 wherein said elongated member is provided with wrench surfaces adjacent its said first end.

6. The tool of claim 5 wherein said nut is provided with wrench surfaces thereon.

7. An oil well sucker rod shear tool, comprising,
an elongated member of generally cylindrical configuration having externally threaded first and second ends,
said elongated member having a pair of spaced apart cylindrical portions formed therein,
said elongated member having a reduced diameter shear portion positioned between said cylindrical portions which will shear upon predetermined stress being subjected thereto,
a sleeve means mounted on said elongated member and sealably embracing said cylindrical portions to prevent corrosive fluid from coming into contact with said shear portion,
and means maintaining said sleeve means on said elongated member.

* * * * *